Patented Nov. 19, 1940

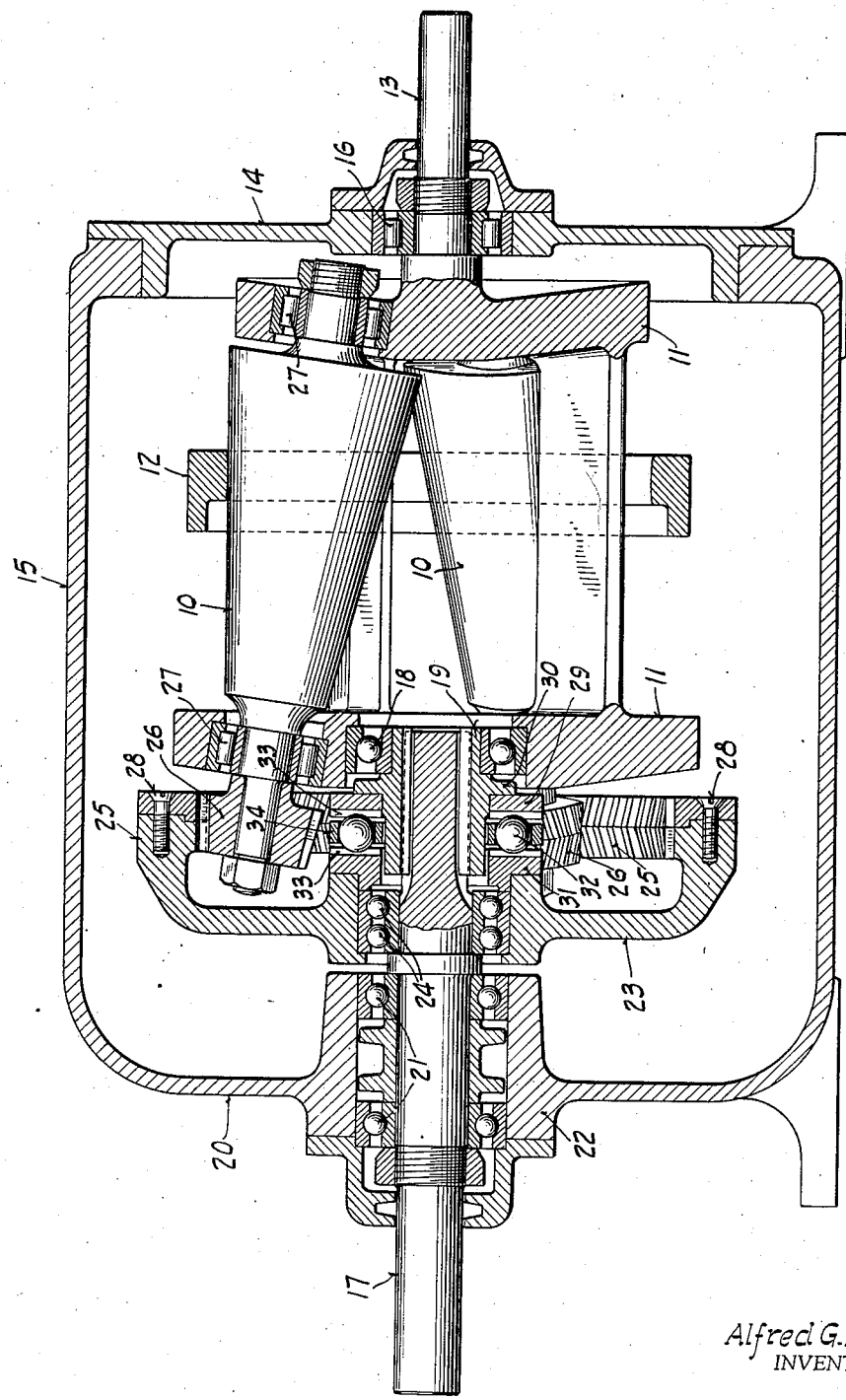

2,222,557

UNITED STATES PATENT OFFICE 2,222,557

VARIABLE SPEED TRANSMISSION

Alfred G. Bade, Milwaukee, Wis., assignor to The Falk Corporation, Milwaukee, Wis., a corporation of Wisconsin Application June 26, 1937, Serial No. 150,500

16 Claims. (Cl. 74—281)

This invention relates to variable speed transmissions of the type involving a set of inclined tapered planet rollers controlled by an encircling traction ring moveable lengthwise thereof.

My prior patent, No. 2,114,245, dated April 12, 1938, discloses a transmission of this type in which the rollers are mounted in a rotary carrier that is axially moveable with respect to the rollers in a manner to develop the required contact pressures between rollers and ring. In the transmission therein shown, provision is made for urging the carrier axially by forces derived from the torque load on the ring, so that the contact pressures vary automatically in accordance with changes in the torque load transmitted by the machine.

One object of the present invention is to simplify the torque responsive pressure inducing means in transmissions of the character mentioned.

Another object is to render the contact pressures between the rollers and ring automatically responsive to the torque load on the power output end of the transmission.

Another object is to provide simple and improved means for preventing relative longitudinal displacement between the several rollers.

Another object is to provide simple and improved means for rendering the rollers longitudinally immoveable.

Other more specific objects and advantages will appear, expressed or implied, from the following description of an illustrative embodiment of the present invention.

The single figure of the accompanying drawing is a longitudinal sectional view of a variable speed transmission constructed in accordance with the present invention.

The transmission selected for illustration is substantially similar to that described in my above identified patent in that it includes three tapered inclined planet rollers 10, journalled in and between the opposite ends of a rotary carrier 11, and controlled by an encircling non-rotatable traction ring 12 which is axially moveable along the rollers. Movement of the ring 12 may be effected and controlled by any appropriate means, such for instance as that disclosed in the copending application of myself and Walter P. Schmitter, Serial No. 100,270, filed September 11, 1936.

In this instance the carrier 11 is supported at one end by an axial integral drive shaft 13, which projects through the removable end head 14 of an appropriate housing 15, and which is journalled in a roller bearing 16 designed to afford limited free axial movement of the shaft and carrier. The other end of the carrier 11 is supported upon the inner end of a driven shaft 17 through the medium of a thrust-sustaining ball bearing 18, fixed to a sleeve 19 which is splined or otherwise connected to rotate with the shaft 17 and to permit free axial movement relative thereto.

The driven shaft 17 projects through the other end 20 of the housing 15 and is journalled in a pair of axially spaced thrust-sustaining ball bearings 21 fixed in a hub portion 22 carried by the housing end 20. The shaft 17 also supports a disk 23, journalled on the shaft 17 through an appropriate thrust-sustaining double ball bearing 24, and carrying an internal ring gear 25, which meshes with a plurality of planet pinions 26 each fixed to an end of one of the planet rollers 10.

Each of the several rollers 10 is journalled at opposite ends in roller bearings 27 designed to permit limited axial displacement between them and the carrier 11. In this instance, however, the ring gear 25 and pinions 26 are utilized to prevent relative axial displacement between the several rollers, this being accomplished in the transmission shown by the use of double-helical or herringbone gears, the oppositely inclined teeth of the ring gear 25 interlocking with the oppositely inclined teeth of the pinions 26 to prevent relative axial displacement thereof. To facilitate assembly, the ring gear 25 is preferably split intermediate the two rows of teeth in a manner to provide two separable single-helical gear parts releasably secured together by appropriate means, such as screws 28.

It will be noted that, mounted in the manner above described, the shaft 17 and gear 25 are fixed against axial displacement, and that the group of rollers 10 are also fixed against lengthwise movement by the above described coaction between the pinions 26 and gear. As above pointed out, however, the roller carrier 11 is mounted to move axially within the housing and with respect to the roller group, the arrangement being such that when the carrier is urged in one direction (in this instance toward the right), it reacts through the axially yieldable bearings 27 to force the rollers 10 outwardly against the ring 12. In the transmission shown this feature is utilized to develop the required contact pressures between the rollers and ring, by the provision of means for imposing an axial thrust on the carrier 11 in the proper direction.

Various types or forms of thrust inducing mechanisms may be employed for this purpose, that shown being designed to render the contact pressures responsive to the torque load on the transmission and particularly to the torque load on the power take-off shaft 17. It comprises a cam ring 29, fixed to the sleeve 19 and bearing against a thrust collar 30 formed on the sleeve, and an opposed cam ring 31 fixed to the hub of the gear carrying disk 23, the rings 29 and 31 being separated by a set of balls 32 interposed therebetween. The balls 32 engage cam grooves 33 in the opposed faces of the rings and are preferably positioned by an appropriate cage or retainer ring 34. Rotation of the ring carrier 23 relative to the shaft 17 is resisted solely by the reaction of the balls 32 against the cam grooves 33, a reaction which tends to separate the rings 29 and 31 and to thus force the ring 29 and sleeve 19 toward the right, thereby imposing a thrust on the roller carrier 11 through the bearing 18 in a manner to urge the carrier toward the right.

Various changes may be made in the embodiment of the invention hereinabove specifically described without departing from or sacrificing the advantages of the invention as defined in the appended claims.

I claim:

1. In a variable speed transmission the combination of a plurality of relatively inclined tapered planet rollers, a rotary carrier therefor in which said rollers are transversely movable, a traction ring encircling and contacting said rollers and movable lengthwise thereof to regulate the speed ratio of the transmission, a plurality of planet pinions each fixed to one of said rollers, and a gear in driving engagement with said pinions, said gear and pinions having teeth coacting to prevent relative lengthwise displacement between rollers in either direction.

2. In a variable speed transmission the combination of a group of relatively inclined tapered planet rollers, a rotary carrier therefor in which said rollers are transversely movable, a traction ring encircling and contacting said rollers and movable lengthwise to regulate the speed ratio of the transmission, a plurality of planet pinions each fixed to one of said rollers, and an axially fixed gear in driving engagement with said pinions, said gear and pinions having teeth coacting to hold said group of rollers against lengthwise movement in either direction.

3. In a variable speed transmission the combination of a group of relatively inclined tapered planet rollers, a rotary carrier therefor in which said rollers are transversely movable, a traction ring encircling and contacting said rollers and moveable lengthwise thereof to regulate the speed ratio of the transmission, a plurality of herringbone pinions each fixed to one of said rollers, and a herringbone gear engaged with said pinions to prevent lengthwise movement of said rollers relative to said gear.

4. In a variable speed transmission the combination of a plurality of relatively inclined tapered planet rollers, a rotary carrier therefor, a traction ring encircling and contacting said rollers and movable lengthwise thereof to regulate their motion, a plurality of pinions each fixed to one of said rollers, a gear engaged in driving relation with said pinions and interlocked therewith to prevent lengthwise movement of said rollers relative to said gear, and mounting means for said gear and carrier permitting relative axial movement between said carrier and gear.

5. In a variable speed transmission the combination of a plurality of relatively inclined tapered planet rollers, a rotary carrier therefor, a traction ring encircling and contacting said rollers and movable lengthwise thereof to regulate their motion, a plurality of pinions each fixed to one of said rollers, a gear engaged in driving relation with said pinions and interlocked therewith to prevent lengthwise movement of said rollers relative thereto, and means for effecting relative axial movement between said carrier and gear, said carrier having means coacting with said rollers to effect lateral movement of the latter in response to said relative axial movement between said carrier and gear.

6. In a variable speed transmission the combination of a plurality of relatively inclined tapered planet rollers, an axially moveable rotary carrier therefor, a traction ring encircling and contacting said rollers and movable lengthwise thereof to regulate their motion, a plurality of planet pinions each fixed to one of said rollers, an axially fixed gear engaged in driving relation with said pinions and interlocked therewith to hold said rollers against axial movement, said carrier having means coacting with said rollers to effect lateral movement thereof in response to axial movement of said carrier.

7. In a variable speed transmission the combination of a plurality of relatively inclined tapered rollers mounted to rotate about their individual axes and about a common central axis, a traction ring encircling and contacting said rollers and movable lengthwise thereof to regulate their motion, a plurality of pinions each fixed to one of said rollers, a gear in driving engagement with said pinions and interlocked therewith to hold said rollers against lengthwise movement, and means movable lengthwise of said rollers to force the latter against said ring.

8. In a variable speed transmission the combination of a plurality of relatively inclined tapered rollers mounted to rotate about their individual axes and about a common central axis, a traction ring encircling and contacting said rollers and movable lengthwise thereof to regulate their motion, a plurality of pinions each fixed to said rollers, a gear in driving engagement with said pinions and interlocked therewith to retain said rollers against lengthwise movement relative to said gear, and means for urging said rollers into pressure contact with said ring.

9. In a variable speed transmission the combination of a plurality of relatively inclined tapered rollers mounted to rotate about their individual axes and about a common central axis, a traction ring encircling said rollers and movable lengthwise thereof to regulate their motion, a plurality of pinions each fixed to one of said rollers, a gear in driving engagement with said pinions and interlocked therewith to retain said rollers against lengthwise movement relative to said gear, and torque responsive means for developing pressure contact between said rollers and ring.

10. In a variable speed transmission the combination of a plurality of relatively inclined tapered rollers mounted for rotation about their individual axes and about a common central axis, a traction ring encircling said rollers and movable lengthwise thereof to regulate their motion, a plurality of pinions each fixed to one of said rollers, a gear in driving engagement with said pinions and interlocked therewith to retain said rollers against lengthwise movement relative to said gear, and means energized by the torque load on said gear for developing pressure contact between said rollers and ring.

11. In a variable speed transmission the combination of a plurality of relatively inclined planet rollers mounted to rotate about their individual axes and about a common central axis, a traction ring encircling said rollers and movable lengthwise thereof to regulate their motion, power take-off mechanism connected with said rollers, said mechanism including parts rotatable relative to each other, and means including an element between said parts energized by the torque load carried by said power take-off mechanism for developing pressure contact between said rollers and ring.

12. In a variable speed transmission the combination of an axially movable rotary carrier, a plurality of relatively inclined tapered planet rollers rotatable with and with respect to said carrier and radially movable in response to axial movement of said carrier, a traction ring encircling said rollers and movable lengthwise thereof to regulate their motion, power take-off mechanism connected with said rollers and including parts rotatable relative to each other, and means between said parts and energized by the torque load carried by said power take-off mechanism for shifting said carrier in a direction to develop contact pressures between said rollers and ring.

13. In a variable speed transmission the combination of a plurality of relatively inclined tapered planet rollers, means mounting said rollers for relative transverse movement, a traction ring encircling and contacting said rollers, said ring and rollers being relatively movable lengthwise of the latter to regulate the speed ratio of the transmission, a plurality of planet pinions each fixed to one of said rollers, a gear in driving engagement with said pinions, and gear teeth upon each of said pinions and said gear, the driving faces of said gear teeth being engaged and coacting to prevent lengthwise movement of said rollers in either direction relative to said gear.

14. In a variable speed transmission the combination of a group of relatively inclined tapered planet rollers, means mounting said rollers for relative transverse movement, a traction ring encircling and contacting said rollers and movable lengthwise thereof to regulate their motion, a plurality of herringbone pinions each fixed to one of said rollers and a herringbone gear engaged with said pinions, the inner peripheral surface of said gear being substantially parallel to the axis of said mounting means, said rollers being restrained against lengthwise movement in either direction relative to said gear solely by engagement between said gear and said pinions.

15. In a variable speed transmission, the combination of an axially movable rotor, a plurality of relatively inclined tapered planet rollers rotatable with and with respect to said rotor, means encircling and contacting said rollers and movable lengthwise thereof to regulate their motion, a driven shaft responsive to the planetary motion of said rollers, means carried by said shaft and coacting with said rollers to control the lengthwise position thereof, and means responsive to axial movement of said rotor for forcing said rollers against said encircling means.

16. In a variable speed transmission, the combination of an axially movable rotor, a plurality of relatively inclined tapered planet rollers rotatable with and with respect to said rotor, means encircling and contacting said rollers and movable lengthwise thereof to regulate their motion, a driven shaft responsive to the planetary motion of said rollers, means carried by said shaft and coacting with said rollers to retain said rollers against endwise movement, and means responsive to axial movement of said rotor for forcing said rollers against said encircling means.

ALFRED G. BADE.